United States Patent [19] [11] Patent Number: 6,163,961
McMeekin [45] Date of Patent: Dec. 26, 2000

[54] PLAIN BEARING WITH OVERLAY

[75] Inventor: Kenneth M McMeekin, Troon, United Kingdom

[73] Assignee: Glacier Vandervell Limited, United Kingdom

[21] Appl. No.: 09/452,873

[22] Filed: Dec. 2, 1999

Related U.S. Application Data

[62] Division of application No. 08/894,650, Aug. 25, 1997, abandoned.

[30] Foreign Application Priority Data

Feb. 25, 1995 [GB] United Kingdom .................... 9503815
Feb. 21, 1996 [WO] WIPO ...................... PCT/GB96/00386

[51] Int. Cl.$^7$ .............................. B21D 53/00; B23P 17/00
[52] U.S. Cl. ........................................ 29/898.056; 72/700
[58] Field of Search ................................ 29/898, 898.13,
29/898.14, 898.056, 898.057, 527.6, 898.42;
148/906; 384/492, 276, 625, 493, 907,
912, 913; 72/700; 228/117, 116, 158, 262.41,
3.1

[56] References Cited

U.S. PATENT DOCUMENTS 3,132,418 5/1964 Fulford .
3,276,103 10/1966 Kopke et al. .
3,350,773 11/1967 Beebe et al. .
4,109,358 8/1978 Duddy et al. .............................. 72/700
4,365,995 12/1982 Mori ......................................... 72/700
5,601,371 2/1997 Koroschetz et al. .

FOREIGN PATENT DOCUMENTS 787412 12/1957 United Kingdom .
923445 4/1963 United Kingdom .
940924 11/1963 United Kingdom .
1072040 6/1967 United Kingdom .
2 233 718 1/1991 United Kingdom .

Primary Examiner—David P. Bryant
Assistant Examiner—Marc W. Butler
Attorney, Agent, or Firm—Nixon & Vanderhye

[57] ABSTRACT

A method of making a multi-layer plain bearing comprises roll-bonding a relatively soft aluminum-tin alloy to a harder aluminum-based bearing substrate and then roll-bonding the composite to a steel backing. Following heat treatment conventional for reticulation of the aluminum-tin alloy the surface is machined to give a precise overall bearing thickness of which the aluminum-tin overlay is in the range of 0.01–0.10 mm, typical of an overlay but having greater fatigue strength and war resistance than conventional electro-deposited materials. Alternatively, the overlay substrate and backing strips may be roll-bonded simultaneously.

31 Claims, 2 Drawing Sheets

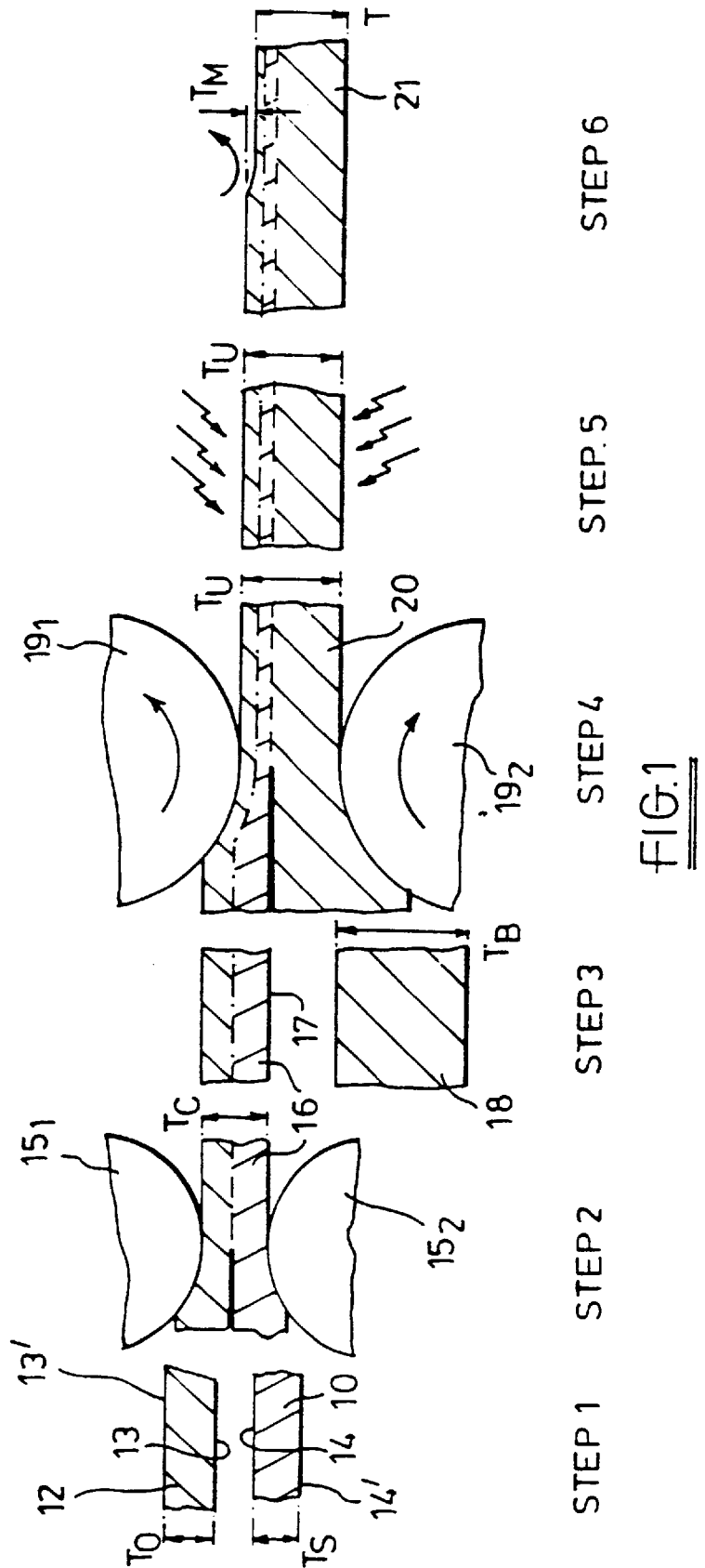

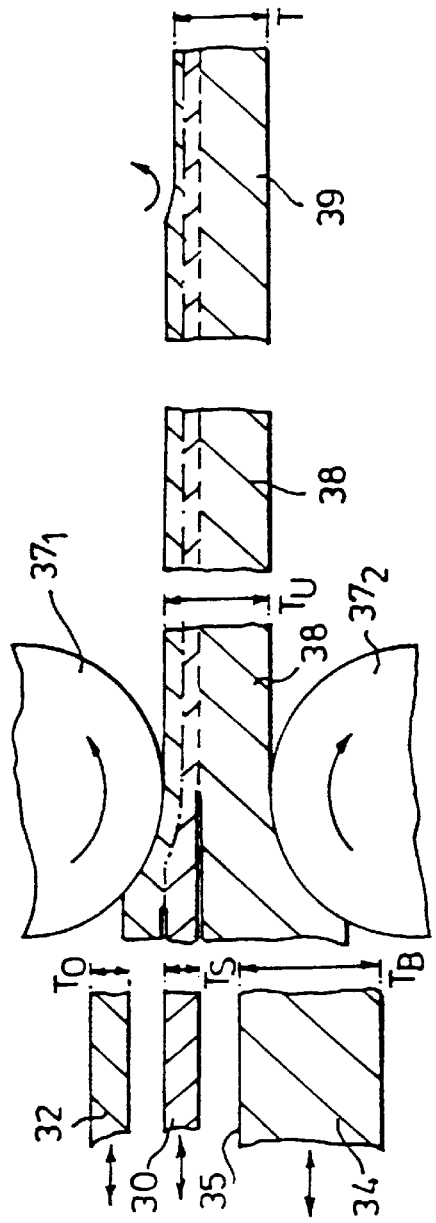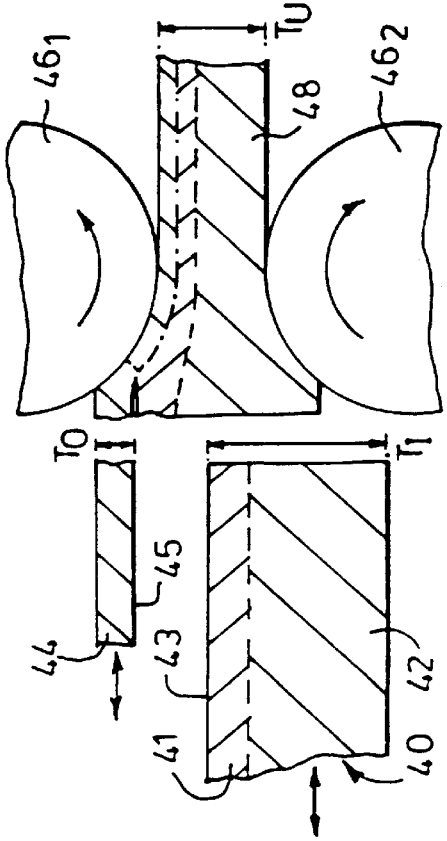

PLAIN BEARING WITH OVERLAY

This is a division of application Ser. No. 08/894,650, filed Aug. 25, 1997 abandoned Feb. 25, 2000, the entire content of which is hereby incorporated by reference in this application.

This invention relates to plain, or sliding, bearings and in particular relates to so-called multi-layer bearings comprising a hard metal backing, a bearing substrate bonded to the backing and an overlay layer on the substrate, and in particular relates to the provision of such an overlay layer.

So-called thin walled bearing shells for automotive and like applications are well known comprising a backing, usually of steel, on which is carried a substrate of metal having bearing properties, usually an alloy of several metals. Best known substrate alloys are leaded bronze-based (comprising copper with lead and tin components) and aluminium-based (comprising aluminium with tin and/or possibly copper, silicon and other inclusions). Leaded bronzes are usually cast or sintered from powder onto the steel backing whereas aluminium-based materials are usually pressure bonded and heat treated.

Aluminium-based alloys principally employ tin as the soft phase that promotes good sliding behaviour, but problems may arise from bonding to the steel backing and running at high temperatures and/or under very high specific loading, such as melting or migration of the tin or fatigue fracturing, even if techniques and treatments are employed to improve the performance of aluminium-tin alloy, such as reticulation of the tin within the aluminium matrix.

The term 'reticular' as applied to an aluminium-tin alloy refers to one in which the aluminium and tin phases are both continuous, the tin phase being continuous along the aluminium grain edges or trigonal boundaries; the achieving of this state, referred to as 'reticulation' is effected by heat treatment, comprising annealing at a temperature and for a time to effect recrystallisation of the tin, subsequent to mechanical working of the alloy by rolling to reduce thickness. The term 'potentially reticular' is used within this specification to refer to a mechanically induced state of the alloy after cold working prior to, and to make it suitable for reticulation by, heat treatment.

Notwithstanding the contribution made by reticulation to improving the fatigue strength of aluminium-tin alloys at elevated temperatures, such materials may not have the capacity to bear heavy and/or concentrated loads.

To mitigate such effects it is known to produce an aluminium-based bearing alloy in which a harder phase material, such as silicon, is incorporated into the aluminium matrix, but problems may then arise with respect to accelerated wear and/or uneven wear of the bearing and/or shaft borne thereby due to poor conformability and embeddability. Conformability is the ability of the bearing alloy to accommodate small misalignments between itself and a rotating shaft, whilst embeddability is the ability to absorb small particles of foreign matter circulating with the lubricant. If such particles are not embedded they may score the bearing and possibly the shaft causing accelerated wear. Therefore, it is common for a bearing substrate comprising such harder bearing alloys to have deposited thereon a thin overlay of soft bearing material which provides good embeddability and conformability, preventing seizure during poorly lubricated start-up conditions and until the bearing and the shaft being borne thereby adapt to each other.

Such overlays are not required to perform a lasting bearing function throughout operation and are invariably of minimal thickness, measured in terms of tens of microns, and most frequently deposited by electro-plating from solution. Such an overlay material has therefore needed to satisfy two criteria, that it is soft enough for the purpose and that it is suitable for deposition by electroplating; in practice the choice has been limited to lead, tin, antimony, indium and copper and combinations thereof. The provision of such a thin overlay by plating also requires manufacturing compromises, such as the bearing being machined to an over-size prior to deposition of the overlay material, and plated to an extent anticipated to provide a thickness which results in the desired nominal size. In general, it is difficult to ensure that the plating operation produces deposition of accurate and uniform thickness, so accurate tolerances are difficult to obtain.

Furthermore such plated overlay often has required also a similarly plated interlayer of nickel, iron, silver, cobalt, copper-zinc or copper-tin to act as a barrier or dam and prevent diffusion of an overlay metal into the bearing substrate alloy.

In addition to the requirement for conformability and embeddability, there is a requirement for compatibility, where the bearing surface must possess a physical resistance to welding or joining to its mating surface under conditions of rubbing and friction. It is found that where an interlayer is formed by nickel and exposed through erosion of the overlayer, such welding or joining can occur due to the poor compatibility of nickel with steel or iron surfaces.

As an alternative to electro plating, it has been proposed to deposit an overlay of metals not conducive to electroplating by sputtering in a vacuum. GB 2233718 describes a sputtered aluminium-tin overlay in which the concentration of tin varies throughout the thickness of the overlay and permitting, where appropriate, a layer of pure non-diffusing metal at the interface in place of a separate interlayer. Clearly such a technique requires specialist technology and equipment not normally found in large scale bearing manufacture.

It is an object of the present invention to provide a multilayer plain bearing having an overlay, and a method of providing such overlay, which mitigates disadvantages and limitations hitherto encountered.

According to a first aspect of the present invention a method of manufacturing a multilayer plain bearing of the type comprising a metal backing, a bearing substrate and a soft overlay layer, comprises pressure bonding to the bearing substrate a potentially reticular, tin rich aluminium-tin alloy overlay layer, by way of an interlayer if necessary, heat treating the bonded overlay to reduce alloy and bond stresses and effect reticulation of the tin in the alloy and machining the surface of the overlay to provide a bearing of predetermined thickness.

Preferably the method includes machining the surface of the overlay to provide an overlay thickness in the range 0.01 mm to 0.10 mm.

In this specification the term tin-rich is intended to include a tin content in the range 15–50%.

According to a second aspect of the invention a multilayer plain bearing manufactured by the method defined in the preceding paragraph comprises a metal backing, bearing alloy substrate and a soft overlay layer on the substrate, the overlay layer being a tin-rich alloy of aluminium-tin pressure bonded to the substrate alloy and having a reticular tin structure due to post bonding heating, and a thickness in the range 0.01 mm to 0.10 mm.

The invention will now be described by way of example with reference to the accompanying drawings, in which:

FIG. 1 is a schematic representation of principal steps in a first method of manufacturing a plain bearing in accordance with the present invention in which an aluminium-based substrate alloy strip and overlay alloy strip are roll bonded into composite strip that is in turn roll bonded to a steel backing strip, FIG. 2 is a schematic representation of principal steps of a second method of manufacturing a plain bearing which is similar to the first method but involves simultaneously roll bonding the backing, substrate and overlay layer, and FIG. 3 is a schematic representation of principal steps in a third method of manufacturing a plain bearing in which an intermediate bearing of substrate and backing is formed and then an overlay alloy layer is bonded to the substrate.

Referring to FIG. 1, in a first method, an aluminium-based bearing substrate is formed by casting an alloy, such as Al-11Si-1Cu or any other composition described in GB 1378743 into a billet or slab which after quenching and extruding it into an elongate substrate strip of thickness $T_S$ shown at 10 in step 1.

A cast alloy of tin rich aluminium-based alloy, such as Al-40Sn-0.5Cu is formed into a slab and clad with commercially pure aluminium sheet on at least one face 13, and conveniently both, faces 13 or 13'. The clad slab is rolled a plurality of times to reduce its thickness (by extension into a strip) and by such cold working modify the aluminium matrix and tin rich regime into a potentially reticular form. To distinguish this strip from the substrate strip, it is convenient to refer to it as the overlay strip, shown at 12 in stage 1, of thickness $T_O$.

One aluminium clad surface 13 of the rolled overlay strip 12 is cleaned by brushing which, at a microscope level also roughens and increases the effective area of the surface. One face 14 of the substrate strip is similarly cleaned and roughened by a linishing belt before the cleaned faces 13, 14 are placed against each other and they are roll bonded together (step 2) by passage between driven rolls $15_1$, $15_2$ of a conventional roll-bonding mill controlled to maintain a predetermined gap between the rolls. In known manner such rolling mill applies bonding pressure by compressing the materials to such extent that they are reduced in thickness to a fraction of the former thickness that relates to an adequate level of mechanical bonding pressure for the materials passing through the rolls. Such rolling arrangement has the benefit that in applying pressure by way of driven rolls whose separation is maintained constant, the bonded strip exiting the rolls is of uniform thickness corresponding to the roll gap, notwithstanding any variations in bonding pressure required to maintain the gap, and the abutting surfaces are bonded without relative displacement in the direction of travel, that is, each strip is reduced in thickness to the same fraction to its initial thickness.

The rolling of step 2 reduces the total strip thickness $(T_O+T_S)$ to a fraction x thereof, to form what may be conveniently referred to as an alloy composite strip 16 of thickness $T_C$ $(=x.(T_O+T_S))$. The alloy composite strip may be heated to effect annealing to a first, or stress relieving, degree of about 200° C. for about 2 hours to relieve stresses in the alloys and bond between them due to the rolling, and not least in putting the relatively hard substrate into a condition where it can be worked further mechanically without cracking.

The exposed substrate alloy surface 17 of the composite strip is thereafter cleaned and roughened by linishing or the like as is a backing strip 18 of low carbon steel of thickness $T_B$ (step 3). The composite and backing strips 16 and 18 are then passed between driven bonding rolls $19_1$ and $19_2$ spaced by a gap $T_U$ set to reduce the combined thickness to a fraction y of initial thickness and mechanically bond them together into a bonded strip 20 that has all of the component layers of the final multilayer bearing, but is of unfinished thickness $T_U$ (step 4), where $T_U=(T_C+T_B)$. The bonded strip is thereafter (step 5) heat treated to a second or recrystallisation degree to reduce not only bonding stresses and mechanical working stresses in the substrate, and possibly overlay, alloy but also to effect reticulation of the tin in the overlay alloy. The heat treatment temperature and times for raising, holding and lowering the strip temperature correspond to those which would be effective in forming a known bearing structure of the Al-40Sn-0.5Cu alloy roll bonded as a substrate to the steel backing; typically the heat treatment involves holding the bonded strip 20 at a temperature in the range 300° C. to 320° C. for approximately 10 hours between heating and cooling periods of about 4 hours.

The heat-treated bonded strip 20 is then machined (step 6) to remove overlay alloy material of a thickness $T_M$, being at least the minimum required to be removed after manufacture to give both an acceptable surface finish and a desired thickness of overlay whilst resulting in a bearing 21 of precise overall thickness T, $(=T_U-T_M)$, including, by appropriate choice of starting thicknesses, substrate and backing of desired thicknesses.

The machining may take place whilst the bonded strip is in a flattened state prior to individual bearing blanks being cut therefrom and deformed into journal shells and the like. The overlay alloy is soft so any convenient machining mechanism may be used. It will be appreciated that because of the soft and easily damaged nature of the overlay, it may be preferred that the bonded strip be cut into blanks and journal bearing shells formed therefrom before final machining, which machining may be effected by a bore broaching technique often employed with part cylindrical journal shell surfaces comprising relatively soft bearing alloys.

It will be appreciated that apart from forming the alloy composite 16, with any heat treatment thereof before use, the manufacturing steps employed are those ordinarily applied in forming a steel-backed bearing shell having an aluminium-silicon alloy substrate. Furthermore, the forming of the alloy composite 16 also only employs the same techniques of roll bonding as employed in the conventional bearing manufacture.

It will be appreciated also that as the bearing is machined to thickness after all of the bearing metal has been deposited the thickness of the bearing as a whole can be defined with tighter tolerances than when a final plating step is involved.

Preferably the final thickness of the overlay layer is in the range 0.01 to 0.10 mm; although a layer of such thickness is impracticably thin to have a separate existence during manufacture, it will be understood that such thickness as is achieved after the final machining process results from, and requires, considerably thicker strip material at progressively earlier stages in the manufacture. Thus, considering a finished bearing of thickness T which is specified as comprising a backing of thickness $T_B'$, a bearing alloy substrate of thickness $T_S'$ and an overlay thickness $T_O'$, that is, $T=T_B'+T_S'+T_O'$, and the fact that the machining thickness $T_M$ has a minimum value which has to be exceeded to provide a suitable bearing surface finish, the bonded strip of thickness $T_U=T_B'+T_S'+(T_O'+T_M)$.

Also, as $T_U=y.(T_C+T_B)$ and $T_C=x.(T_C+T_B)$, the starting thicknesses for the various strip materials employed are therefore $T_B=(1/y).T_B'$ $T_S=(1/xy).T_S'$ $T_O=(1/xy).(T_O'+T_M)$.

Typically, $T_M$ may have a minimum value of 0.25 mm, x and y being fractions of between 55% and 60%, say, 57%, corresponding to a thickness reduction of 43%.

The above described method may be applied to forming a plain bearing with an aluminium-based substrate of different composition for which minor variations in procedure may be required, for example with an aluminium-based substrate containing tin in small quantities and/or with other elements that give the substrate a degree of hardness that can benefit from a softer overlay.

Examples of such alloys which are roll bonded to steel backings to form bearings hitherto known and are available from the Applicant under the designated type numbers are Al-6Sn-1Cu-1Ni (being designated Glacier AS11) Al-12Sn-4Si-2Cu (designated Glacier AS124) and Al-12Sn-4Si-1Cu (designated Glacier AS124A).

It is well known that pressure bonding an aluminium-tin alloy to a steel backing benefits from the use of a pure aluminium interlayer or interface which acts as a dam or barrier to prevent exuding of tin during rolling and/or the formation of iron-tin intermetallics upon bonding or in the subsequent heat treatment, and such interface may be included for any appropriate substrate alloy in a bearing and method in accordance with this invention.

To this end it is usual for the cast billet or slab of substrate alloy to be clad on one or both surfaces 14, 14' with pure aluminium prior to rolling into strip form. It will be appreciated that the above described method may be varied to the extent that an aluminium interlayer between overlay alloy strip and substrate strip may be formed at the surface of the substrate rather than the overlay strip as described hereinbefore, that is both faces of the substrate strip being aluminium clad. However, it may still be desirable to protect the exposed surface of the overlay alloy by such an aluminium layer until final machining and to this end one or both surfaces 13, 13' of the overlay alloy strip may be clad with pure aluminium.

Depending upon the difference in concentration of tin, and possibly other elements, between the substrate and overlay alloy, an interlayer may not be necessary between the substrate alloy and overlay alloy. Apart from the question as to the requirement for, and disposition of, an aluminium interlayer between the substrate and overlay layers, a substrate containing sufficient tin may also be cold rolled to effect a potentially reticular state in a substrate strip 10 before use, so that the final heat treatment after bonding to the backing effects reticulation of the tin in both the overlay and substrate materials.

In the above described method a composite alloy strip is formed by roll bonding together the substrate and overlay strips before the composite strip is roll bonded to a steel backing. In a second method which is a variant thereof, and the steps of which are illustrated schematically in FIG. 2, substrate alloy and overlay alloy strips 30 and 32 are prepared as described above for forming a composite alloy, that is, are cast, clad with aluminium if necessary, and cold rolled to provide the appropriate dimensions and metallurgical properties, and the faces thereof are suitable cleaned and roughened (step 1). A backing strip 34 is likewise cleaned and roughened on one surface 35 (step 1) and the three strips are roll bonded together in a single pass through rolls $37_1$ and $37_2$ which are set to a separation $T_U$, which corresponds to the unfinished thickness $T_U$ of the bonded strip 38 (step 2). The bonded strip 38 is thereafter subjected to the above described heat treatment (step 3), blanking and forming, and final machining (step 4) to define the bearing 39 of total thickness T and overlay thickness $T_O'$.

It will be appreciated that as the substrate and overlay alloys are subjected only to a single reduction in thickness by roll bonding, the initial thickness $T_O$ and $T_S$ of the overlay and substrate are correspondingly less than when forming a composite, namely $T_S=(1/y).T_S'$ and $T_O=(1/y).(T_O'+T_M)$.

A third method of manufacture may be employed with bearings whose substrates are applied to the backing other than by roll bonding. It is known to cast or sinter a copper-based bearing substrate onto a steel or bronze backing, such substrate usually being a bronze containing lead as a particularly soft phase material. Such a bearing form is normally provided by milling the surface of cast material to a predetermined depth at which optimum metallurgical properties are found and for both cast or sintered materials a rolling operation is carried out on the bimetallic strip, to the extent of reducing the thickness of each of the components by about 4%, to consolidate the materials and provide a uniform thickness along the length of the strip, and a suitable surface finish, for depositing an overlay layer thereon by the aforementioned electro-deposition of available materials.

In accordance with the present invention such the bearing construction is employed to form what is in this case an intermediate bearing form 40, comprising a substrate 41 of Cu-23Pb-1.5Sn cast onto a steel backing 42, which is machined and rolled to a predetermined thickness $T_1$ (step 1) before the exposed surface 43 of the substrate 42 is roughened and cleaned by linishing or the like. An aluminium clad, tin-rich, aluminium-tin alloy is formed as described above, being rolled into an overlay strip 44 of thickness $T_O$ having a potentially reticular tin structure. An aluminium surface 45 of the overlay strip is cleaned and by way thereof the overlay strip 44 is roll bonded to the substrate surface 43 of the intermediate bearing, by a single pass through rolls 46, and 462 which effect bonding between the strips by decreasing their respective thickness to a fraction z of the original thickness, z being in the range 55–60%, to give a multilayer bonded strip 48 of thickness $T_U$ (step 2).

The bonded strip 48 is heat treated (step 3) at such temperature and for such time as to relieve bond stresses and effect reticulation of the tin component of the alloy. The heat treatment differs from that described above for aluminium-based substrates in having to be performed at a lower temperature to avoid sweating of lead from the substrate. However, the effect of the heat treatment is the same in providing a well bonded overlay layer having good fatigue and wear properties.

The bonded strip 48 of thickness $T_U$ is, after the heat treatment, formed into individual bearing shells and/or machined to the depth $T_M$ that represent at least the minimum removal to present a suitable bearing surface and leave an overlay layer of desired thickness $T_O'$ in a bearing 49 of overall thickness T.

As described above in relation to the second method, as the overlay alloy strip 44, and indeed the bronze bearing substrate, are subjected to a single rolling step and consequent reduction in thickness, the starting thickness $T_O$ of the overlay strip 44 is $T_O=(1/z).(T_O'+T_M)$.

The pure aluminium cladding to the overlay alloy provides a barrier or dam both to tin being forced to the alloy surface prior to, and possibly during, cold rolling and roll bonding and also to prevent lead and/or copper diffusing from the substrate to the overlay during or subsequent to heat treatment.

Clearly such method may be employed to provide an overlay layer to intermediate bearings having different substrate alloy composition, such as cast Cu-17Pb-5Sn, sintered Cu-26Pb-1.5Sn (designated Glacier SP), or Cu-22Pb-4.5Sn (designated Glacier SX).

The above methods have been described with reference to a particularly soft aluminium based bearing alloy which is particularly suited to the overlay function, but it will be appreciated that the overlay alloy may have a different concentration of tin, and thus different properties, depending upon the hardness of the substrate alloy and/or the nature of the surface against which the plain bearing is to bear.

The overlay alloy may contain tin to an amount in the range 15–50% by wt, such concentration being able to be reticulated. One such alloy conventionally employed as a bearing material which requires no separate overlay layer, and thus is suitable as an overlay layer, is Al-20Sn-1Cu. The lower tin content makes it harder than Al-40Sn-0.5Cu but nevertheless considerably softer than substrate materials such as Al-11Si-1Cu and a shaft made of iron rather than steel.

Irrespective of the concentration of tin in the aluminium-tin overlayer alloy, the overlay is produced from materials which are unobjectionable on environmental grounds whilst also avoiding the chemical process of electroplating which is difficult to control in respect of deposition thickness and uniformity and employing techniques current in the production of such plain bearings, that is, rolling, roll bonding, heat treatment and machining (bore broaching) and results in overlay having greatly improved wear resistance and fatigue strength, well known for these alloys, in comparison with electro-deposited materials.

Whereas an aluminium interlayer between the overlay and substrate layers performs a metallurgical function in respect of damming diffusion or interaction of elements between the overlay and substrate alloys where the materials and conditions are susceptible, it may be found desirable in some instances to have such interlayer which functions to inhibit the propagation of any cracks, forming at the surface of the overlay material, into the substrate layer, such function being in addition to acting as a metallurgical dam or barrier when one is required.

Whereas the requirement for a pure aluminium interlayer depends upon the substrate alloy, to the extent that it may only be necessary when an aluminium-based substrate has a significant Sn content, (such as the aforementioned Al-12Sn-4Si-2Cu or Al-12Sn-4Si-1Cu) and the bonded interface becomes structurally indistinct after the post bonding heat treatment, such condition also tends not to impede crack propagation between the alloy layers to the extent normally expected from a physical discontinuity between dissimilar materials.

It has been found that an aluminium-based alloy that is solution treatable to increase its strength, such as Al-1Cu, Al-4.5Cu-0.8Mn-0.6Mg-0.7Si or Al-4Si-1Cu may be employed to good effect.

Accordingly, in the first and second manufacturing methods described above, such an aluminium-based alloy may be substituted for the commercially pure aluminium as cladding on the Al-Sn alloy to be rolled into the overlay strip or substrate strip. Such cladding may be conveniently applied to one face of the substrate alloy before it is rolled and annealed to give the substrate strip whereas commercially pure Al cladding is applied to the other face that is intended to be bonded to the steel backing. The aluminium alloy cladding is applied at such an initial thickness to result in an interlayer thickness in the range 0.015 mm to 0.04 mm the final bearing strip.

As mentioned hereinbefore, it is known with conventional plated overlays to have an interlayer per se between substrate and overlay, but that such materials compatible with the substrate and plated overlay material may suffer from poor compatibility with an iron-based shaft running thereon. An aluminium-based alloy may be used between the overlay layer and substrate without such difficulty.

It will be appreciated that whilst roll bonding is a widely used practical form of pressure bonding, performance of the invention is not limited to the use of roll bonding where suitable pressure bonding alternatives exist.

Although for most purposes it is appropriate to form plain bearings of the types described above on a steel backing, it is possible to provide bearings with a backing of other materials, such as bronze or possibly copper-based alloy which is work hardened in a roll bonding operation provided that the final heat treatment is between the temperature at which the copper-based alloy loses its work hardening and it is not subject to a second roll bonding.

Implementation of the above described three methods may be further appreciated with reference to respective ones of the following three Examples.

EXAMPLE 1

Using the first of the above described methods, a bearing substrate strip was formed from extruded Al-11Si-1Cu by rolling to a thickness ($T_s=$) 8.00 mm.

A cast slab of Al-40Sn-0.5Cu was clad with pure Al sheet and rolled into a strip having a potentially reticular form and thickness ($T_o=$) 2.80 mm. After brushing an Al face of the overlay strip and linishing the substrate strip the cleaned faces were placed together to form a stack of total thickness 10.80 mm. The stacked strips were passed between rolls of a conventional roll bonding mill with the rolls set to a gap of 1.80 mm to produce an alloy composite strip of thickness ($T_c=$) 1.80 mm.

The composite strip was heat treated by raising it to 200° C. held for 2 hours.

A low carbon steel backing strip of thickness ($T_B=$) 2.00 mm was prepared and one surface cleaned and roughened by linishing.

The exposed substrate alloy was cleaned and roughened by linishing and the clean surfaces placed together and the strips passed through a roll bonding mill with the roll gap set to 2.16 mm.

The hardened strip was heat treated by heating it over a 4 hour period to 310° C. and holding it there for 10 hours before cooling to room temperature over a further 4 hours. The (clad) overlay alloy of the heat treated, bonded strip was machined to a depth of ($T_m=$) 0.25 mm, resulting in a final bearing thickness of T=1.19 mm.

EXAMPLE 2

Using the second of the above described methods, the Al clad overlay strip and backing strip of Example 1 were prepared as for that example to thickness ($T_o=$) 0.60 mm and ($T_B=$) 2.00 mm respectively. A substrate strip was prepared from an Al-clad slab of Al-6Sn-1Cu-1Ni rolled to a thickness ($T_s=$) 0.91 mm.

Surfaces of the overlay, substrate and backing strips were cleaned by brushing or Finishing as appropriate and passed through a roll bonding mill set to a roll gap of 2.00 mm, providing a trimetal bonded strip of corresponding thickness ($T_s=$) 2.00 mm.

The bonded strip was heat treated as in Example 1 and the surface of the overlay alloy was machined away to a depth of ($T_m=$) 0.25 mm to give a bearing of final thickness (T=) 1.75 mm.

EXAMPLE 3

Using the third method described above an intermediate bearing form was prepared by sintering a substrate of Cu-26Pb-1.5Sn powder onto a low carbon steel backing strip and, after consolidation rolling, giving an intermediate bearing thickness ($T_1=$) 3.58 mm.

An Al clad overlay strip was prepared as for Examples 1 and 2 and rolled to a thickness ($T_o=$) 0.79 mm.

The surfaces of the overlay strip and intermediate bearing were cleaned and roughened and passed through a roll bonding mill set to a gap of 2.49 mm.

The bonded strip of thickness ($T_u=$) 2.49 mm and heat treated for 10 hours at a temperature between 285° C. and 310° C.

The overlay alloy surface of the heat trimetal strip was then machined away to a depth of 0.25 mm, resulting in a final bearing thickness of (T=) 2.24 mm.

In each of the three examples, the resultant overlay thickness of the bearing was 0.05 mm, and the overlay layer exhibited fatigue strength and wear resistance, well known for the overlay material per se, and an improvement in comparison with plated overlays.

What is claimed is:

1. A method of manufacturing a multilayer plain bearing having an overlay, the bearing comprising a hard backing layer, a bearing alloy substrate layer bonded to the hard backing layer and an overlay layer bonded to the bearing alloy substrate layer, said overlay layer being soft relative to the bearing alloy substrate layer, the method comprising the steps of:
   (a) providing separate strips of said backing layer, bearing alloy substrate and overlay layers, said overlay layer comprising an aluminum-tin alloy having from 15 to 50 wt % of tin therein;
   (b) pressure bonding said bearing alloy substrate layer and overlay layer together to form a first composite material;
   (c) heat treating said first composite material at a temperature such as cause annealing and stress relieving of said first composite material;
   (d) pressure bonding said heat treated first composite material to said hard backing layer such that the bearing alloy substrate layer is adjacent the backing layer to form a second composite material;
   (e) heat treating said second composite material at a temperature such as to cause reticulation of said aluminum-tin alloy overlay layer; and
   (f) machining the surface of said overlay layer in said second composite material to achieve a desired thickness of said overlay layer in said plan bearing.

2. A method of manufacturing a multilayer plain bearing according to claim 1 further including the step of cladding with an aluminum material at least the surface of the overlay strip layer which is to be adjacent the substrate bearing alloy layer prior to pressure bonding the overlay layer to the substrate bearing alloy layer to form the first composite material.

3. A method according to claim 2 wherein both surfaces of said overlay strip layer are clad with an aluminum material prior to pressure bonding to said substrate bearing alloy layer to form said first composite material.

4. A method according to claim 1 wherein at least the surface of said substrate bearing alloy layer which is to be adjacent the hard backing material is clad with an aluminum material prior to bonding to the overlay strip layer to form the first composite material.

5. A method according to claim 4 wherein both faces of the substrate bearing alloy strip layer are clad with an aluminum material prior to pressure bonding to the overlay layer to form the first composite material.

6. A method according to claim 1 wherein a strip of aluminum material is inserted between the substrate bearing alloy strip layer and the overlay strip layer prior to pressure bonding the substrate bearing alloy and overlay strip layers together to form the first composite material.

7. A method according to claim 1 wherein the overlay layer of the second composite material is machined to a thickness lying in the range from 0.01 to 0.1 mm.

8. A method according to claim 1 wherein the second composite material is formed into a bearing prior to the overlay layer being machined to a thickness lying in the range from 0.01 to 0.1 mm.

9. A method according to claim 8 wherein the overlay alloy machining step is effected by bore broaching.

10. A method according to claim 1 wherein the pressure bonding steps are effected by roll-pressure bonding by passing the constituent strip layers through a rolling mill to effect a predetermined reduction in thickness.

11. A method according to claim 1 wherein the thickness of the substrate bearing alloy layer in the second composite material prior to machining the overlay layer is achieved only by size rolling reduction steps from the point where said substrate bearing alloy material layer is pressure bonded to the overlay alloy layer to form the first composite layer.

12. A method of manufacturing a multilayer plain bearing having an overlay, the bearing comprising a hard backing layer, a substrate bearing alloy layer bonded to the hard backing layer and an overlay layer bonded to the substrate bearing alloy layer, said overlay layer being soft relative to the substrate bearing alloy layer, the method comprising the steps of: providing separate strips of said backing layer, said substrate bearing alloy and said overlay layers; said overlay layer comprising an aluminum-tin alloy having from 15 to 50 wt % of tin therein; simultaneously pressure bonding said hard backing material strip layer, said substrate bearing alloy strip layer and said overlay strip layer together to form a composite material; heat treating said composite material at a temperature such as to cause reticulation of said aluminum-tin alloy overlay layer; and machining the surface of said overlay layer in said composite material to achieve a desired thickness of said overlay layer.

13. A method according to claim 12 further including the step of cladding with an aluminum material at least the surface of the overlay strip layer which is to be adjacent the substrate bearing alloy layer prior to pressure bonding the backing, substrate bearing alloy and overlay layers together to form the composite material.

14. A method according to claim 13 wherein both surfaces of said overlay strip layer are clad with an aluminum material prior to pressure bonding the hard backing, substrate bearing alloy and overlay layers together to form said composite material.

15. A method according to claim 12 wherein at least the surface of said substrate bearing alloy layer which is to be adjacent the hard backing material is clad with an aluminum material prior to bonding the hard backing, substrate bearing alloy and overlay strip layers together to form the composite material.

16. A method according to claim 15 wherein both faces of the substrate bearing alloy strip layer are clad with an aluminum material prior to pressure bonding the hard backing, substrate bearing alloy and overlay strip layers together to form the composite material.

17. A method according to claim 12 wherein a strip of aluminum material is inserted between the substrate bearing alloy strip layer and the overlay strip layer prior to simultaneously pressure bonding the hard backing, substrate bearing alloy and overlay strip layers together to form the composite material.

18. A method according to claim 12 wherein the overlay layer of the composite material is machined to a thickness lying in the range from 0.01 to 0.1 mm.

19. A method according to claim 12 wherein the composite material is formed into a bearing prior to the overlay layer being machined to a thickness lying in the range from 0.01 to 0.1 mm.

20. A method according to claim 19 wherein the overlay alloy machining step is effected by bore broaching.

21. A method according to claim 12 wherein the simultaneous pressure bonding step is effected by roll-pressure bonding by passing the constituent strip layers through a rolling mill to effect a predetermined reduction in thickness.

22. A method according to claim 12 wherein the thickness of the substrate bearing alloy layer in the composite material prior to machining the overlay layer is achieved only by size rolling reduction steps from the point where said substrate bearing alloy material layer is simultaneously pressure bonded to the overlay alloy layer on one face thereof and to the hard backing strip on the other face thereof to form the composite material.

23. A method of manufacturing a multilayer plain bearing having an overlay, the bearing comprising a hard backing layer, a substrate bearing alloy layer bonded to the bearing alloy hard backing layer and an overlay layer bonded to the substrate bearing alloy layer, said overlay layer being soft relative to the substrate bearing alloy layer, the method comprising the steps of: providing a first composite strip comprising a layer of a relatively hard backing material having a layer of a substrate bearing alloy material bonded thereto, said substrate bearing alloy material layer comprising a copper-based alloy; providing an overlay strip layer; said overlay strip layer comprising an aluminum-tin alloy having from 15 to 50 wt % of tin therein; pressure bonding said first composite strip and overlay strip layers together to form a second composite material; heat treating said second composite material at a temperature such as to cause reticulation of said aluminum-tin alloy overlay layer; and machining the surface of said overlay layer in said second composite material to achieve a desired thickness of said overlay layer.

24. A method according to claim 23 further including the step of cladding with an aluminum material at least the surface of the overlay strip layer which is to be adjacent the substrate bearing alloy layer prior to pressure bonding to the first composite material so as to form the second composite material.

25. A method according to claim 23 wherein both surfaces of said overlay strip layer are clad with an aluminum material prior to pressure bonding to said first composite material.

26. A method according to claim 23 wherein the overlay layer of the second composite material is machined to a thickness lying in the range from 0.01 to 0.1 mm.

27. A method according to claim 23 wherein the second composite material is formed into a bearing prior to the overlay layer being machined to a thickness lying in the range from 0.01 to 0.1 mm.

28. A method according to claim 27 wherein the overlay alloy machining step is effected by bore broaching.

29. A method according to claim 24 wherein the pressure bonding step is effected by roll-pressure bonding by passing the constituent strips through a rolling mill to effect a predetermined reduction in thickness.

30. A method according to claim 24 wherein the thickness of the substrate bearing alloy layer in the second composite material prior to machining the overlay layer is achieved only by size rolling reduction steps from the point where said first composite material strip is pressure bonded to the overlay alloy strip layer to form said second composite material.

31. A method according claim 23 wherein said substrate layer is formed on said relatively hard backing layer by a technique selected from the group comprising sintering of a powder and casting of a molten metal.

* * * * *